United States Patent [19]

Davis

[11] Patent Number: 4,630,650

[45] Date of Patent: Dec. 23, 1986

[54] SPIRAL RIBBED PIPE

[75] Inventor: Paul K. Davis, Alameda, Calif.

[73] Assignee: Pacific Roller Die Co., Inc., Hayward, Calif.

[21] Appl. No.: 660,637

[22] Filed: Oct. 15, 1984

[51] Int. Cl.[4] .................................................. F16L 11/16
[52] U.S. Cl. ..................................... 138/154; 138/129; 138/135; 138/136; 138/140
[58] Field of Search ............... 138/129, 150, 154, 135, 138/136, 140

[56] References Cited

U.S. PATENT DOCUMENTS

| 901,534 | 10/1908 | Hamlin | 138/154 |
|---|---|---|---|
| 1,340,818 | 5/1920 | Brinkman | 138/135 |
| 1,453,220 | 4/1923 | Witzenmann | 138/150 X |
| 1,570,886 | 1/1926 | Fulton et al. | 138/136 |
| 1,677,523 | 7/1928 | Herbst et al. | 138/135 |
| 1,885,587 | 11/1932 | Burton | 138/150 X |
| 2,118,060 | 5/1938 | Stone et al. | 138/154 X |
| 3,621,884 | 11/1971 | Trihey | 138/154 |
| 4,326,561 | 4/1982 | Kutnyak | 138/136 |
| 4,509,560 | 4/1985 | Schafer | 138/154 |

FOREIGN PATENT DOCUMENTS

| 543926 | 1/1932 | Fed. Rep. of Germany | 138/135 |
|---|---|---|---|
| 82/01757 | 5/1982 | World Int. Prop. O. | 138/154 |

Primary Examiner—James E. Bryant, III
Attorney, Agent, or Firm—Ernest M. Anderson

[57] ABSTRACT

A spiral ribbed pipe formed from an elongate strip coiled helically. The pipe has a helical seam and an integral reinforcing rib formed along and around the seam, thereby increasing strength and rigidity of the pipe and its seam. The helical seam comprises a pair of interlocking edges located radially inward of the rib and intermediate a pair of offsets, whereby the inner surface of each coil of strip is longitudinally aligned with the surfaces of adjacent coils to provide a smooth interior pipe surface.

10 Claims, 7 Drawing Figures

SPIRAL RIBBED PIPE

This invention relates generally to a pipe or tube formed from an elongated strip coiled helically and edge seamed. Novelty of the invention resides in providing such a pipe or tube construction having an integral reinforcing rib over or along the seam, thus increasing pipe strength and rigidity.

The use of lock seams to join the edges of helically formed pipe from strip is well known in the pipe making art, as taught in U.S. Pat. No. 3,247,692. The use of corrugations is also known in that art as taught in U.S. Pat. No. 2,136,943. In addition, helical pipe has been disclosed which includes both a lock seam corrugations, such as illustrated and described in U.S. Pat. No. 4,161,194. But none of the prior art known to applicant teaches or suggests a pipe construction that provides a helical seam that is reinforced by an integral corrugation or rib formed over or along the seam. To that end, this invention is directed.

Thus, a principal object of the present invention is to provide a spirally formed pipe having a helical seam and an integral reinforcing rib, said seam defining a relatively smooth pipe surface, said reinforcing rib being helically formed over or along the seam.

Other objects of this invention will become apparent in view of the following detailed description.

In the drawings forming a part of this application and in which like parts are identified by like reference numerals, FIG. 1 is a perspective view of a preferred embodiment of the invention in a spiral ribbed pipe;

Figure 1:
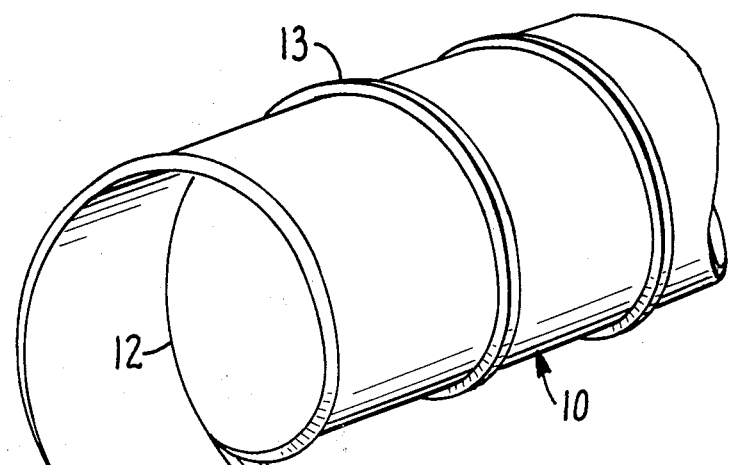
Figure 2:
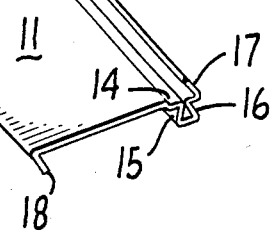
FIG. 2 is a transverse section of strip that has been rolled and deformed to make the spiral ribbed pipe.
Figure 3:
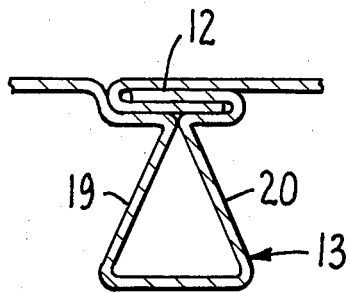
FIG. 3 is a transverse section taken through two adjacent edges of strip that have been lock-seamed to form the pipe shown in FIG. 1.

Referring to FIGS. 1, 2 and 3 in particular, there is shown a spiral pipe 10 formed from an elongated strip 11 that is coiled helically, said pipe having a helical seam 12 and an integral reinforcing rib 13 formed thereover. Seam 12 defines a relatively continuous and smooth pipe surface which, when formed interiorly of the pipe, enhances the fluid flow characteristics. Reinforcing rib 13 is formed along the seam 12, thus strengthening the pipe and increasing its rigidity.

The pipe shown in FIG. 1 is formed from an elongated strip which is passed through a set of rolls that progressively deforms and shapes the strip transversely. A first offset 14 of approximately three-strip thicknesses is provided for receiving interlocking edges of the strip, thereby forming a relatively smooth surface across the seam. Second and third offsets 15 and 16, respectively, are formed to provide the integral reinforcing rib 13, and a fourth offset 17 is made for engaging one edge of the strip with the opposite edge of the strip as provided by a fifth offset 18. The strip is then coiled helically and adjacent edges of the coiled strip are engaged and rolled to form the lock seam.

The triangular cross-section of rib 13 is defined by a pair of leg portions 19 and 20 that extend helically around the pipe and diverge radially outward from the seam. This type of rib shape is preferred for manufacturing purposes. This rib configuration may also be formed interiorly of the pipe by coiling the strip as to provide an exterior seam and an interior rib. Pipe formed with an interior rib may be used with a liner, the rib functioning as a foot or cleat that anchors the liner as well as increasing strength and rigidity.

Figure 4:
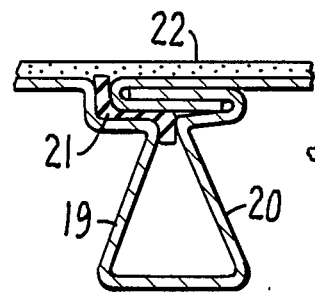
FIGS. 4, 5 and 6 illustrate modifications in spiral pipe formed in accordance with this invention.

Referring to FIG. 4, a modification of lock seam is illustrated which employs a resilient filler strip 21 and a liner 22. The use of filler strip 21 more effectively seals the lock seam to prevent fluid from seeping into the triangular channel defined by rib 13. used with liner 22 as shown, filler strip 21 also functions to secure the liner within the pipe. A polymeric liner may be incorporated and bonded to filler strip 21 by spraying it on as a liquid after pipe 10 has been preformed with filler strip 21 in place. As an alternative, liner 22 may be preformed as a tube, inserted into pipe 10 and then heat sealed to filler strip 21.

Figure 5:
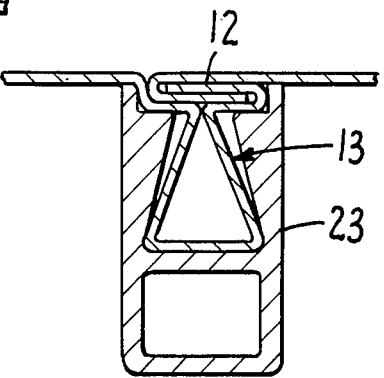

FIG. 5 illustrates the use of a strengthening element 23 that helically encircles the pipe and encloses the reinforcing rib. The use of such an element is of advantage in improving pipe strength, particuarly for larger diameter pipes or where load conditions require greater strength than is provided by the pipe alone. The reinforcing element is shaped to conform with the rib to which it is applied and is squeezed onto the rib after the pipe is spirally formed.

Figure 6:
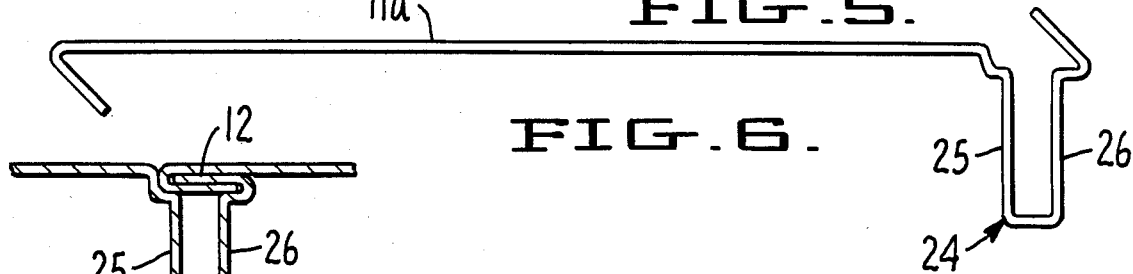
Figure 7:
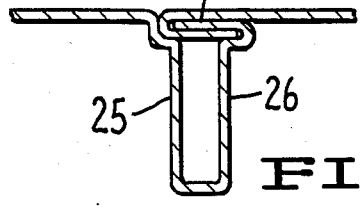
FIG. 7 is a transverse section of two adjacent edges of strip that have been lock-seamed with the strip prepared as shown in FIG. 6.

FIGS. 6 and 7 illustrate another embodiment of the invention in a spiral pipe having a reinforcing rib 24 that is substantially U-shaped or rectangular in cross-section. The strip 11a which is used for forming the pipe is prepared by rolling and deforming to provide similar offsets to those described in connection with the strip shown in FIG. 2. Rib 24 is defined by a pair of parallel leg portions 25 and 26 that extend helically around the pipe and project radially outward relative to the pipe axis. This rib-shape provides a higher strength to weight ratio as compared with the embodiment shown in FIGS. 2 and 3, but is more difficult to manufacture. As with the strip embodiment shown in FIG. 2, rib 24 may be formed interiorly of the pipe by coiling the strip as to provide a relatively smooth exterior seam.

Although preferred embodiments of the invention have been illustrated and described, various modifications and changes may be resorted to without departing from the spirit of the invention or the scope of the appended claims, and each of such modifications and changes is contemplated.

What is claimed is:

1. A spiral ribbed pipe formed from an elongated strip coiled helically, said pipe having a helical sam and an integral reinforcing rib formed helically along said seam, said helical seam comprising interlocking edges of said coiled strip, said integral reinforcing rib being formed adjacent one edge of the elongated strip, the improvement wherein each rib comprises a pair of leg portions of substantially equal length, the radially inward end of each leg being offset approximately three strip thicknesses from the inner surface of the pipe, said interlocking edges of said coiled strip being located between the ends of said leg portions and the inner surface of said pipe, whereby the inner surface of each coil of said coiled strip is longitudinally aligned with the surfaces of adjacent coils to provide a smooth interior pipe surface.

2. The spiral pipe or tube of claim 1, said helical seam comprising the interlocking edges of the strip, said integral reinforcing rib being formed adjacent one edge of the elongated strip.

3. The spiral pipe or tube of claim 1, said integral reinforcing rib being substantially triangular in cross-section, said rib being formed by a pair of leg portions that extend helically around the pipe and diverge radially from said seam.

4. The spiral pipe of claim 1, said integral reinforcing rib being substantially U-shaped in cross-section, said rib being formed by a pair of parallel leg portions that extend helically around the pipe and project radially from said seam.

5. The spiral pipe or tube of claim 1 and further comprising a strengthening element that helically encircles the pipe and encloses said integral reinforcing rib.

6. The spiral pipe of claim 1, said strip having a first offset for receiving said interlocking edges to provide a smooth interior surface and further comprising a resilient filler strip lodged between said first offset and said seam.

7. The spiral pipe or tube of claim 6 and further comprising a liner within said pipe attached to and anchored by said filler strip.

8. A spiral pipe formed from an elongated strip coiled helically, said pipe having a helical seam and an integral reinforcing rib formed helically along said seam, said helical seam comprising the interlocking edges of said coiled strip, said integral reinforcing rib being formed adjacent one edge of the elongated strip, the improvement wherein said elongated strip is formed with a first offset for receiving interlocking edges of said coiled strip, second and third offsets forming an integral reinforcing rib helically over interlocking edges of said coiled strip, and a fourth offset including one side edge for engaging the opposite side edge to provide an interlocking seam engagement radially inward of said rib, said first offset being approximately equal to three strip thicknesses, the interlocking edges of said coiled strip being located in said first offset, whereby the inner surface of each coil of said coiled strip is longitudinally aligned with the surfaces of adjacent coils to provide a smooth interior pipe surface.

9. The spiral pipe or tube of claim 8, each of said first, second and third offsets being formed by a pair of bends in opposite directions; said fourth offset being formed by a bend angled back in the direction of said first offset.

10. The spiral pipe or tube of claim 8, said second and third offsets including leg portions integrally joined at one end, the leg portion of said second offset being integrally joined to said first offset, the leg portion of said third offset being integrally joined to said fourth offset.

* * * * *